(12) United States Patent
Lee et al.

(10) Patent No.: US 12,308,455 B2
(45) Date of Patent: May 20, 2025

(54) BATTERY PACK, ELECTRONIC DEVICE AND VEHICLE

(71) Applicant: LG ENERGY SOLUTION, LTD., Seoul (KR)

(72) Inventors: Bum-Jick Lee, Daejeon (KR); Young-Su Son, Daejeon (KR); Hyoung-Chul Yoon, Daejeon (KR); Young-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 532 days.

(21) Appl. No.: 17/771,270

(22) PCT Filed: Nov. 20, 2020

(86) PCT No.: PCT/KR2020/016518
§ 371 (c)(1),
(2) Date: Apr. 22, 2022

(87) PCT Pub. No.: WO2021/107517
PCT Pub. Date: Jun. 3, 2021

(65) Prior Publication Data
US 2022/0367954 A1 Nov. 17, 2022

(30) Foreign Application Priority Data

Nov. 29, 2019 (KR) .................. 10-2019-0157633
Nov. 18, 2020 (KR) .................. 10-2020-0154939

(51) Int. Cl.
*H01M 50/24* (2021.01)
*H01M 50/213* (2021.01)
(Continued)

(52) U.S. Cl.
CPC ......... *H01M 50/24* (2021.01); *H01M 50/213* (2021.01); *H01M 50/296* (2021.01);
(Continued)

(58) Field of Classification Search
CPC .... H01M 50/20; H01M 50/24; H01M 50/296; H01M 50/213
See application file for complete search history.

(56) References Cited

U.S. PATENT DOCUMENTS

2007/0287035 A1* 12/2007 Marmaropoulos . H01M 50/256
429/430
2009/0253027 A1 10/2009 Yang et al.
(Continued)

FOREIGN PATENT DOCUMENTS

CN 101989667 A 3/2011
CN 108808300 A 11/2018
(Continued)

OTHER PUBLICATIONS

Office Action issued Oct. 10, 2023 for counterpart Japanese Patent Application No. 2022-503965.
(Continued)

*Primary Examiner* — Kenneth J Douyette
(74) *Attorney, Agent, or Firm* — Morgan, Lewis & Bockius LLP

(57) ABSTRACT

Disclosed is a battery pack having improved waterproofing performance. The battery pack includes a plurality of secondary batteries; a connector including a connection terminal configured to receive electricity from an external device or to supply power to an outside of the battery pack, and an electrically insulating body surrounding a portion of the connection terminal; a pack housing having an inner space in which the plurality of secondary batteries are accommodated and having an insert hole so that at least a part of the body of the connector is inserted therein; and a connector gasket interposed between the insert hole and the connector and having a portion that is bent at least once in one direction, the connector gasket being at least partially com- (Continued)

pressed and fixed by inserting the connector into the insert hole.

9 Claims, 8 Drawing Sheets

(51) Int. Cl.
*H01M 50/296* (2021.01)
*H01R 13/52* (2006.01)
*H01R 103/00* (2006.01)

(52) U.S. Cl.
CPC ......... *H01R 13/52* (2013.01); *H01M 2220/20* (2013.01); *H01R 2103/00* (2013.01); *H01R 2201/26* (2013.01)

(56) References Cited

U.S. PATENT DOCUMENTS

| | | |
|---|---|---|
| 2011/0070466 A1 | 3/2011 | Park et al. |
| 2014/0287283 A1 | 9/2014 | Kimpara et al. |
| 2015/0114090 A1 | 4/2015 | Fukuda |
| 2018/0190965 A1 | 7/2018 | Lee et al. |
| 2019/0027719 A1 | 1/2019 | Kim et al. |
| 2019/0109315 A1 | 4/2019 | Hagino et al. |
| 2019/0348806 A1 | 11/2019 | Mizrahi et al. |

FOREIGN PATENT DOCUMENTS

| | | |
|---|---|---|
| CN | 110301055 A | 10/2019 |
| EP | 2280436 A2 | 2/2011 |
| JP | 2007-127206 A | 5/2007 |
| JP | 2010-140873 A | 6/2010 |
| JP | 2011-504645 A | 2/2011 |
| JP | 2011-103259 A | 5/2011 |
| JP | 2014-40846 A | 3/2014 |
| JP | 2014-220045 A | 11/2014 |
| JP | 2018-168881 A | 11/2018 |
| JP | 2019-071201 A | 5/2019 |
| JP | 2021-12818 A | 2/2021 |
| KR | 10-2007-0110567 A | 11/2007 |
| KR | 10-2012-0059106 A | 6/2012 |
| KR | 10-2015-0049292 A | 5/2015 |
| KR | 10-2016-0150460 A | 12/2016 |
| KR | 10-2017-0012779 A | 2/2017 |
| KR | 10-2018-0048399 A | 5/2018 |
| KR | 10-2018-0126928 A | 11/2018 |
| KR | 10-2019-0006214 A | 1/2019 |
| KR | 10-2011784 B1 | 8/2019 |

OTHER PUBLICATIONS

Search Report issued on Aug. 23, 2023 in counterpart Chinese Patent Application No. 202080053547.1.
Office Action issued in corresponding Japanese Patent Application No. 2022-503965 dated Mar. 6, 2023.
International Search Report (with partial English translation) and Written Opinion issued in corresponding International Patent Application No. PCT/KR2020/016518 dated Feb. 25, 2021.
Extended European Search Report, dated Jun. 21, 2023, issued in corresponding EP Patent Application No. 20894714.3.

* cited by examiner

BATTERY PACK, ELECTRONIC DEVICE AND VEHICLE

TECHNICAL FIELD

The present disclosure relates to a battery pack, an electronic device, and a vehicle, and more particularly, to a battery pack with improved waterproofing performance.

The present application claims priority to Korean Patent Application No. 10-2019-0157633 filed on Nov. 29, 2019 and Korean Patent Application No. 10-2020-0154939 filed on Nov. 18, 2020 in the Republic of Korea, the disclosures of which are incorporated herein by reference.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. The lithium secondary battery includes an electrode assembly in which a positive electrode plate coated with the positive electrode active material and a negative electrode plate coated with the negative electrode active material are disposed with a separator being interposed therebetween, and a cylindrical battery can for hermetically containing the electrode assembly together with an electrolyte to serve as an exterior.

In recent years, secondary batteries are widely used not only in small-sized devices such as portable electronic devices, but also in medium-sized and large-sized devices such as vehicles and power storage systems. When used in such a medium-sized or large-sized device, a large number of secondary batteries are electrically connected to increase capacity and output.

Meanwhile, as the need for a large-capacity structure is increasing in recent years along with the utilization as an energy storage source, the demand for a battery pack including a plurality of secondary batteries electrically connected in series and/or in parallel, a module case for accommodating the secondary batteries and a battery management system (BMS) is also increasing.

In addition, the battery pack generally further includes an outer housing made of a metal material to protect or accommodate the plurality of battery cells from an external shock, separate from the module case accommodating the plurality of secondary batteries. In addition, the outer housing requires excellent waterproofing ability so as to prevent water from penetrating therein from the outside.

That is, in the prior art, for example, if water flows into the battery pack mounted to a device due to an accident, the water may permeate into the outer housing of the battery pack, or, in severe cases, the water may flow therein. Accordingly, a personal accident may occur due to an electric shock as the battery pack is short-circuited, or an internal short circuit may occur, which may lead to a thermal runaway or fire of the secondary battery.

DISCLOSURE

Technical Problem

The present disclosure is designed to solve the problems of the related art, and therefore the present disclosure is directed to providing a battery pack, an electronic device and a vehicle with improved waterproofing performance.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:
  a plurality of secondary batteries;
  a connector including a connection terminal configured to receive electricity from an external device or supply a power to the outside, and a body having electric insulation and configured to surround a portion of the connection terminal;
  a pack housing configured to form an inner space for accommodating the plurality of secondary batteries and having an insert hole formed so that at least a part of the body of the connector is inserted therein; and
  a connector gasket interposed between the insert hole and the connector and having a portion that is bent at least once in one direction, the connector gasket being at least partially compressed and fixed by inserting the connector into the insert hole.

Also, the pack housing may have an accommodation portion formed by indenting a peripheral portion of the insert hole in an inner direction, and
  the connector may include:
  an insert portion configured to protrude in a lower direction to be inserted into the insert hole; and
  a fixing portion configured to protrusively extend in a horizontal direction from an upper portion of the insert portion to be fixed to the accommodation portion.

Moreover, the connector gasket may include:
  a mounting portion configured to be compressed and fixed to the accommodation portion by the fixing portion; and
  a first bent portion bent from the mounting portion to extend in a lower direction to be inserted into the insert hole, the first bent portion being compressed and fixed by the insert portion.

In addition, the connector gasket may further include:
  a second bent portion bent from the mounting portion to extend in an upper direction and interposed between an inner sidewall of the accommodation portion and the fixing portion of the connector.

Further, the connector gasket may further include:
  a third bent portion exposed out of the accommodation portion and bent from an end of the second bent portion in an extending direction to extend in a horizontal direction.

Also, the connector gasket may further include:
  a protrusion exposed out of the accommodation portion and bent from an end of the second bent portion in an extending direction to cover a gap between the second bent portion and the fixing portion.

Moreover, a pressing protrusion configured to press the first bent portion toward an edge of the insert hole may be formed at the insert portion.

In addition, the insert hole may have a tapered structure configured to have a diameter gradually decreasing in a lower direction.

Further, the mounting portion may further include:
a perforated hole into which a bolt is inserted; and
a cushion portion formed by raising a peripheral portion of the perforated hole to buffer that the bolt compresses the peripheral portion of the perforated hole.

In addition, in another aspect of the present disclosure, there is also provided an electronic device, comprising at least one battery pack.

Further, in another aspect of the present disclosure, there is also provided a vehicle, comprising at least one battery pack.

Advantageous Effects

According to an embodiment of the present disclosure, since the battery pack of the present disclosure includes the connector gasket having a portion bent at least once in one direction and interposed between the insert hole and the connector and at least partially compressed and fixed by inserting the connector into the insert hole of the top cover, it is possible to prevent foreign substances from penetrating into the gap between the connector and the pack housing. In particular, since the portion of the connector gasket that is bent at least once may be compressed and fixed to the insert hole of the top cover by the connector, the waterproofing ability may be effectively improved.

Also, according to another embodiment of the present disclosure, since the connector gasket further includes the second bent portion that is bent from the mounting portion to extend in an upper direction and is interposed between the inner sidewall of the accommodation portion and the fixing portion of the connector, the connector gasket has more bending structures and compression portions compared to the connector gasket of FIG. 6, thereby further improving the sealing property between the connector and the accommodation portion.

In addition, according to another embodiment of the present disclosure, since the connector gasket further includes the protrusion that is exposed out of the accommodation portion and is formed at an end of the second bent portion in an extension direction, the sealing property between the connector and the accommodation portion may be further improved compared to the connector gasket of FIG. 9, and the first bent portion may be prevented from being pushed down in a lower direction so as to be properly positioned in the insert hole. Accordingly, it is possible to improve the manufacturing efficiency and the waterproofing ability of the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
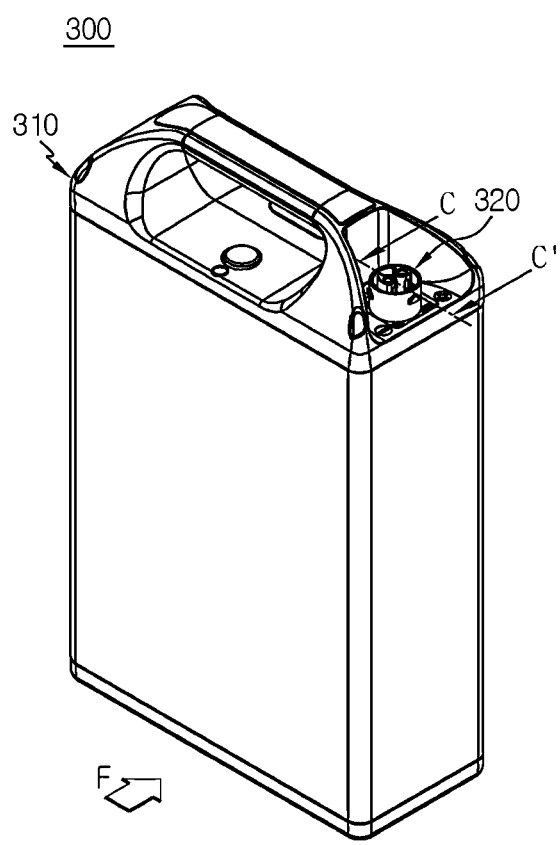
FIG. 1 is a perspective view schematically showing a battery pack according to an embodiment of the present disclosure.
Figure 2:
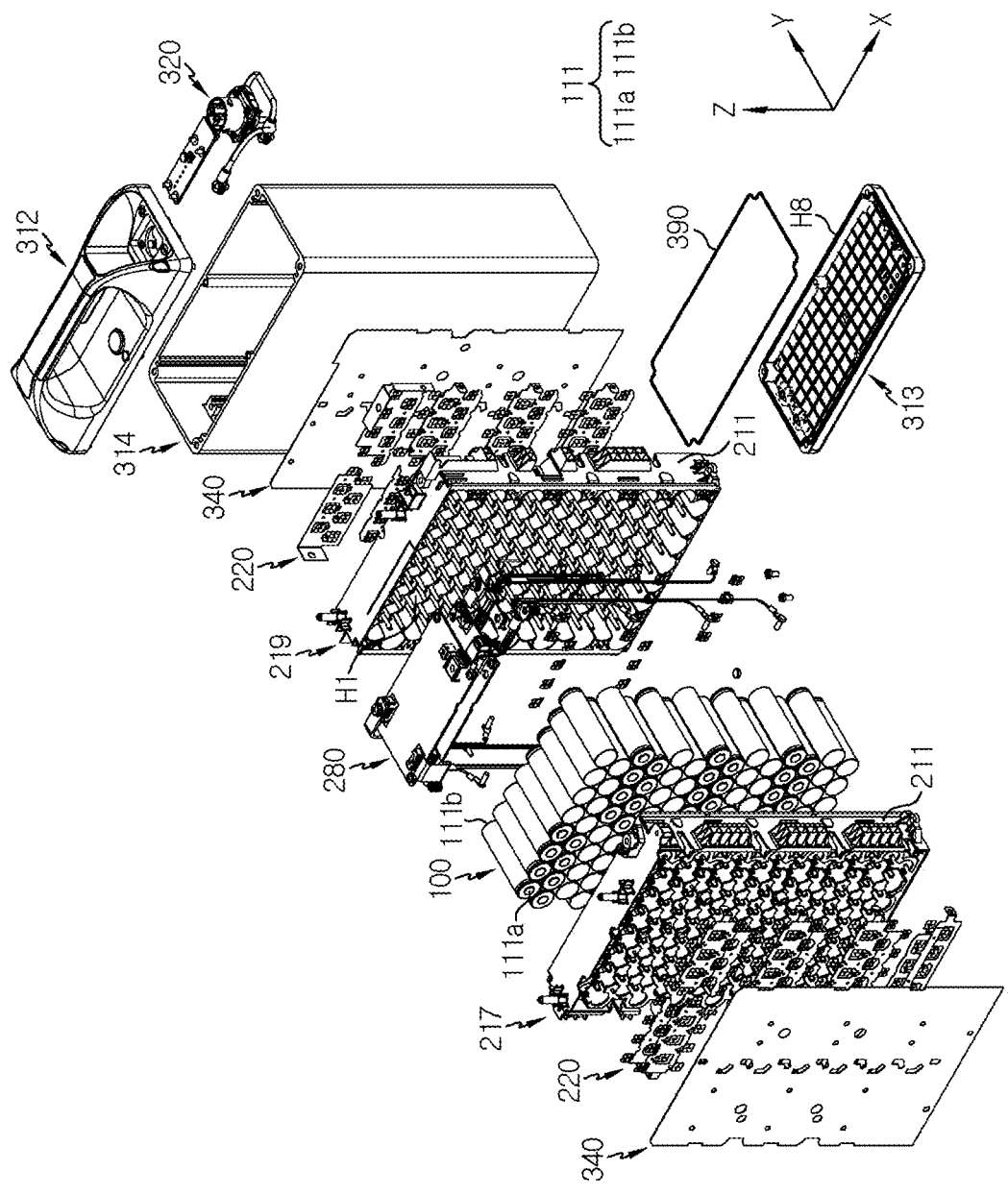
FIG. 2 is an exploded perspective view schematically showing some components of the battery pack according to an embodiment of the present disclosure.
Figure 3:
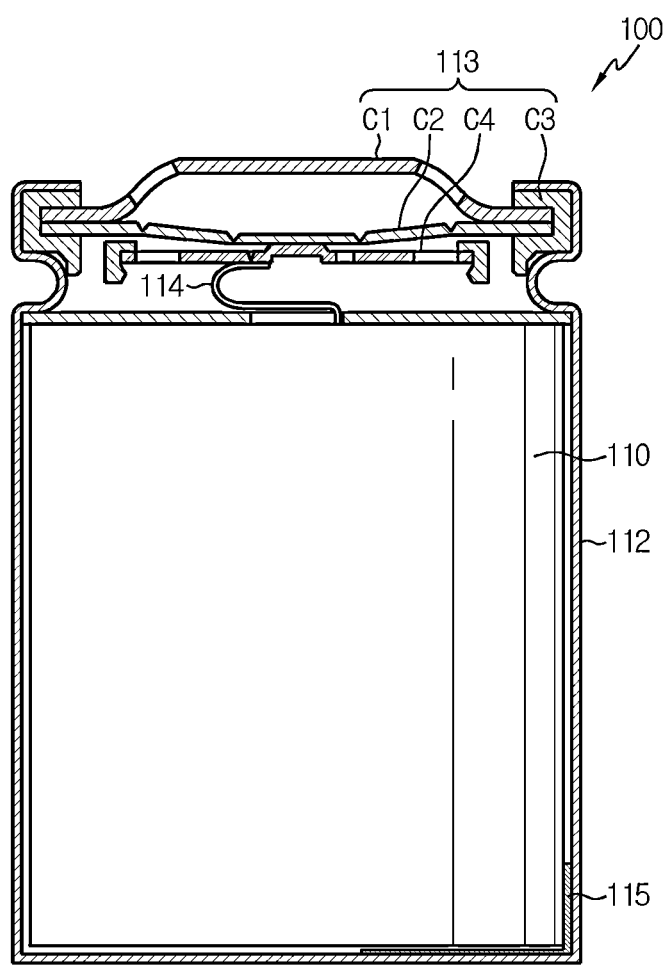
FIG. 3 is a sectional view schematically showing a secondary battery according to an embodiment of the present disclosure.
Figure 4:
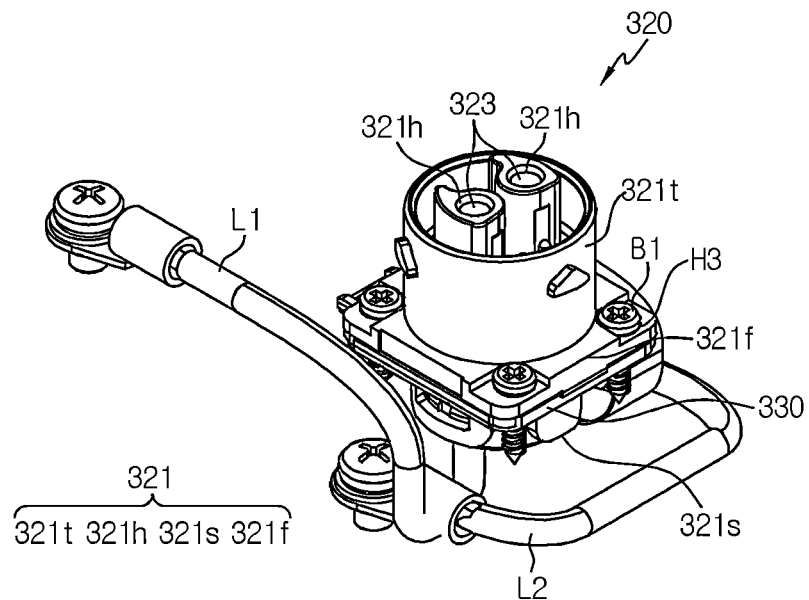
FIG. 4 is a perspective view schematically showing a connector and a connector gasket, employed at the battery pack according to an embodiment of the present disclosure.

FIG. 1 is a perspective view schematically showing a battery pack according to an embodiment of the present disclosure. FIG. 2 is an exploded perspective view schematically showing some components of the battery pack according to an embodiment of the present disclosure. FIG. 3 is a sectional view schematically showing a secondary battery according to an embodiment of the present disclosure. Also, FIG. 4 is a perspective view schematically showing a connector and a connector gasket, employed at the battery pack according to an embodiment of the present disclosure.

Referring to FIGS. 1 to 4, a battery pack 300 of the present disclosure includes a plurality of secondary batteries 100, a connector 320, a pack housing 310, and a connector gasket 330.

Here, the plurality of secondary batteries 100 may be a plurality of can-type secondary batteries 100. Here, the can-type secondary battery 100 may include an electrode assembly 110, a battery can 112, and a cap assembly 113.

The electrode assembly 110 may have a structure in which a positive electrode plate and a negative electrode plate are wound with a separator being interposed therebetween. Also, a positive electrode tab 114 may be attached to the positive electrode plate to be connected to the cap assembly 113, and a negative electrode tab 115 may be attached to negative electrode plate to be connected to a lower end of the battery can 112.

The battery can 112 may have an empty space formed therein so that the electrode assembly 110 is accommodated therein. In particular, the battery can 112 may be configured in a cylindrical or rectangular shape with an open top. In addition, the battery can 112 may be made of a metal material such as steel or aluminum to secure rigidity. In addition, the negative electrode tab may be attached to the lower end of the battery can 112 so that not only a lower part of the battery can 112 but also the battery can 112 itself may function as a negative electrode terminal.

The cap assembly 113 may be coupled to the open top of the battery can 112 to seal the open end of the battery can 112. The cap assembly 113 may have a circular shape or a rectangular shape according to the shape of the battery can 112, and may include sub-components such as a top cap C1, a safety vent C2 and a gasket C3.

Here, the top cap C1 is positioned at the top of the cap assembly 113 and may be configured to protrude in an upper direction. In particular, the top cap C1 may function as a positive electrode terminal in the secondary battery. Therefore, the top cap C1 may be electrically connected to another secondary battery 100 or a charging device through an external device such as a bus bar 220. The top cap C1 may be made of a metal material such as stainless steel or aluminum, for example.

The safety vent C2 may be configured to change its structure when an internal pressure of the secondary battery 100, namely an internal pressure of the battery can 112, increases over a certain level. In addition, the gasket C3 may be made of a material with electrical insulation so that edge portions of the top cap C1 and the safety vent C2 are insulated from the battery can 112.

Meanwhile, the cap assembly 113 may further include a current interrupt member C4. The current interrupt member C4 is also called CID (Current Interrupt Device). If the shape of the safety vent C2 is reversed as internal pressure of the battery increases due to gas generation, the contact between the safety vent C2 and the current interrupt member C4 is cut off, or the current interrupt member C4 is damaged, thereby cutting the electrical connection between the safety vent C2 and the electrode assembly 110.

The configuration of the secondary battery 100 is widely known to those skilled in the art at the time of filing of this application and thus will not be described in detail in this specification. In addition, although an example of the secondary battery 100 is shown in FIG. 3, the battery pack 300 according to the present disclosure is not limited to a specific configuration of the secondary battery 100. That is, various secondary batteries known at the time of filing of this application may be employed in the battery pack 300 according to the present disclosure.

For example, the secondary battery 100 of FIG. 3 is illustrated as a cylindrical secondary battery 100, but a rectangular secondary battery may also be applied to the battery pack 300 according to the present disclosure.

Referring to FIG. 2 again, the plurality of secondary batteries 100 may be arranged in a left and right direction (X-axis direction) and an upper and lower direction (Z-axis direction). For example, as shown in FIG. 2, the plurality of secondary batteries 100 may be arranged in an upper and lower direction and a left and right direction. Moreover, the plurality of secondary batteries 100 may be arranged so that portions of the cylindrical battery cans 112 (in FIG. 3) formed in a tubular shape face each other.

That is, the plurality of secondary batteries 100 may be configured to be laid in a horizontal direction (Y-axis direction). Here, the horizontal direction means a direction parallel to the ground. That is, as shown in FIG. 2, each of 112 secondary batteries 100 may be configured to be elongated in a front and rear direction. In this case, in all secondary batteries 100, when viewed in the F direction of FIG. 1, positive electrode terminals 111a and negative electrode terminals 111b may be positioned at front and rear sides thereof, respectively.

Meanwhile, terms indicating directions such as 'front', 'rear', 'left', 'right', 'upper' and 'lower' used in this specification may vary depending on the position of an observer or the form of a placed object. However, in this specification, for convenience of explanation, the directions such as 'front', 'rear', 'left', 'right', 'upper' and 'lower' are distinguishably expressed based on the case of being viewed in the F direction.

Referring to FIG. 2 again, a module case 210 may include a first case 217 and a second case 219. The first case 217 may be configured such that the second case 219 is coupled to a rear side thereof. For example, as shown in FIG. 2, the battery pack 300 may include the first case 217 and the second case 219 positioned at the rear side of the first case 217, when viewed in the Y-axis direction. Each of the first case 217 and the second case 219 may have a hollow H1 formed so that front and rear portions of the secondary battery 100 may be inserted therein.

In addition, the module case 210 may include an outer wall 211. Therefore, according to this configuration of the present disclosure, since the module case 210 includes the outer wall 211, the plurality of secondary batteries 100 accommodated therein may be effectively protected from external shock.

In addition, at least two secondary batteries 100 may be accommodated in the inner space of the module case 210 in a horizontal direction (Y-axis direction). The stacking direction is not necessarily limited to one direction, and may also be an upper and lower direction (Z-axis direction) according to the laid direction of the secondary batteries 100.

Therefore, according to this configuration of the present disclosure, since the exposure of the side surfaces of the secondary battery 100 is blocked by the electrically insulative module case 210, the secondary battery 100 may improve electrical insulation to external conductive objects and be protected from external physical or chemical elements.

Meanwhile, referring to FIG. 2 again, the battery pack 300 of the present disclosure may include a plurality of bus bars 220. The plurality of bus bars 220 may electrically connect the plurality of secondary batteries 100, for example all secondary batteries 100, to each other. That is, one bus bar 220 may electrically connect some secondary batteries 100 to each other. To this end, at least a portion of the bus bar 220 may be made of an electrically conductive material. For example, the bus bar 220 may be made of a metal material such as copper, aluminum and nickel.

Moreover, the bus bar 220 may have a structure in which two kinds of plates using different main materials are joined. For example, the bus bar 220 may have a form in which a plate made of nickel as a main material and a plate made of copper as a main material are joined.

In addition, in the present disclosure, the bus bar 220 may be configured in a plate shape, as shown in FIG. 2. Moreover, the bus bar 220 may be configured in the form of a metal plate to ensure rigidity and electrical conductivity. In particular, the bus bar 220 may be configured to be erected in an upper and lower direction (Z-axis direction in the drawing) along the electrode terminals 111 of the plurality of secondary batteries 100.

That is, in the present disclosure, if the plurality of secondary batteries 100 are arranged in a left and right direction (X-axis direction in the drawing) and/or an upper and lower direction (Z-axis direction in the drawing) in the form of being laid down long in a front and rear direction (Y-axis direction in the drawing), the electrode terminals 111 of several secondary batteries 100 may be located at both ends in the front and rear direction (Y-axis direction). At this time, the bus bar 220 may be formed in a shape that is flatly extended in the left and right direction and the upper and lower direction as a plate shape and erected with respect to the ground according to the arrangement direction of the electrode terminals 111 of the plurality of secondary batteries 100.

In addition, the bus bar 220 may contact the electrode terminals 111 of at least some secondary batteries 100 among all secondary batteries 100 and electrically connect them in parallel and in series.

Further, an insulation sheet 340 with electric insulation may be provided to an outer side of the bus bar 220. For example, as shown in FIG. 2, two insulation sheets 340 may be provided on a front surface of the bus bar 220 located at the front side and a rear surface of the bus bar 220 located at the rear side, respectively.

Referring to FIG. 4 along with FIG. 2, the connector 320 may include a connection terminal 323 and a body 321. The connection terminal 323 may be connected to a charging terminal (not shown) to receive electricity from an external charging device (not shown) when electric charging of the plurality of secondary batteries 100 is required. Alternatively, if it is required to supply a power to an external electronic device (not shown), the connection terminal 323 may be electrically connected to an external connection terminal (not shown) to supply a power to the outside. Further, the connector 320 may be configured to be electrically connected to a BMS module 280.

In addition, the connection terminal 323 may be a female connection terminal or a male connection terminal. For example, as shown in FIG. 4, the connection terminal 323 may be a female connection terminal 323 embedded in a connection hole 321h into which an external male connection terminal (not shown) may be inserted. In addition, the connection terminal 323 may include an electrically conductive metal or alloy. For example, the metal may be nickel, copper, aluminum, or the like.

In addition, the body 321 may include an electrically insulating synthetic resin. The body 321 may have a space for accommodating the connection terminal 323 therein. The body 321 forms the exterior of the connector 320.

Moreover, the body 321 may include a coupling portion 321t configured so that an external male connector (not shown) is inserted therein. The coupling portion 321t may have a tubular structure extending in an upper and lower direction. The tubular structure of the coupling portion 321t may be configured to form a predetermined space by being spaced apart from the connection hole 321h by a predetermined distance so that a part of the external male connector 320 is inserted therein.

In addition, the body 321 may include a fixing portion 321f formed at a lower end of the tubular structure of the coupling portion 321t to protrusively extend in a horizontal direction. A fixing hole H3 may be formed in the fixing portion 321f so as to be bolted to the pack housing 310.

Further, the body 321 may include an insert portion 321s protrusively extending in a lower direction at a lower end of the fixing portion 321f. That is, the fixing portion 321f may be positioned above the insert portion 321s.

In addition, the connector 320 may include wires L1, L2 configured to electrically connect the plurality of secondary batteries 100 and the connection terminal 323 to each other so that the wires L1, L2 are connected to the connection terminal 323 located inside the body 321.

Figure 5:
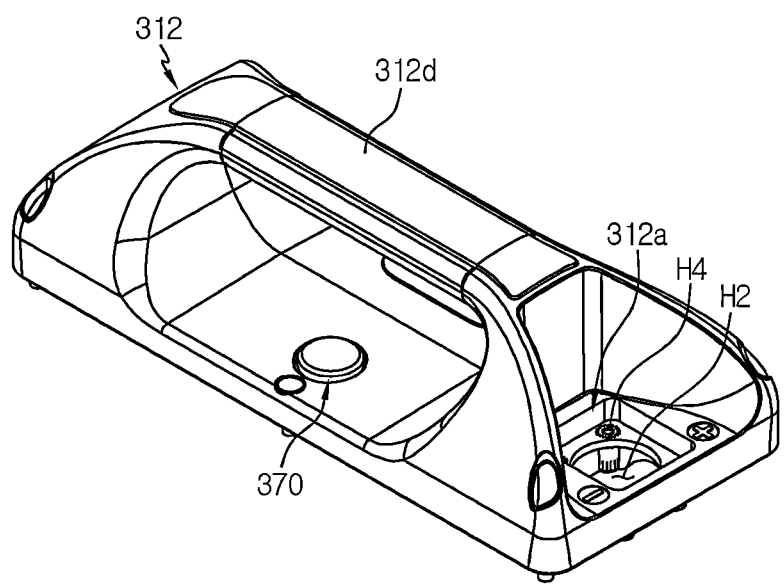
FIG. 5 is a perspective view schematically showing a top cover, employed at the battery pack according to an embodiment of the present disclosure.

FIG. 5 is a perspective view schematically showing a top cover, employed at the battery pack according to an embodiment of the present disclosure.

Referring to FIG. 5 along with FIGS. 1 and 2, the pack housing 310 may include a top cover 312, a middle housing 314 and a bottom support 313 configured to form an inner space for accommodating the plurality of secondary batteries 100. Specifically, when viewed in the F direction, the middle housing 314 may be coupled to a lower portion of the top cover 312. At this time, a first sealing gasket 380 (FIG. 7) may be interposed between the top cover 312 and the middle housing 314. For example, a linear groove H7 (FIG. 7) may be formed to extend along an edge of a lower end of the top cover, and the first sealing gasket 380 (FIG. 7) may be inserted into the linear groove H7.

In addition, the bottom support 313 may be coupled to a lower portion of the middle housing 314. At this time, a second sealing gasket 390 may be interposed between the middle housing 314 and the bottom support 313. A linear groove H8 (FIG. 2) extending along a horizontal edge of the bottom support 313 may be formed at the second sealing gasket 390, and the second sealing gasket 390 may be inserted into the linear groove H8.

More specifically, the top cover 312 may have an external shape to cover an upper portion of the module case 210 accommodated in the pack housing 310. In addition, the middle housing 314 may have a rectangular tube shape with open upper and lower portions. Further, the bottom support 313 may have a box shape with an open upper portion, which includes side walls and a lower wall.

In addition, the top cover 312 may include a handle 312d at an upper portion thereof. A vent portion 370 configured to discharge an internal gas to the outside when the internal pressure rises above a predetermined level may be formed at a lower portion of the handle 312d.

Moreover, an insert hole H2 may be formed at a right side of the top cover 312 so that at least a part of the body 321 of the connector 320 is inserted therein. For example, the insert portion 321s of the body 321 of the connector 320 may be inserted into the insert hole H2 of the top cover 312.

In addition, the top cover 312 may include an accommodation portion 312a formed by indenting a peripheral portion of the insert hole H2 in an inner direction. Here, the 'inner direction' may refer to a direction in which the BMS module 280 (FIG. 2) accommodated in the top cover 312 is located. The accommodation portion 312a may be formed to indent by a size corresponding to the fixing portion 321f of the connector 320. That is, the accommodation portion 312a may be shaped to be indented to a depth such that the fixing portion 321f of the connector 320 may be inserted therein. Moreover, a bolt hole H4 configured so that a bolt is inserted therein may be formed at the accommodation portion 312a. The bolt hole H4 may be configured so that the fixing portion 321f of the connector 320 is bolted onto the accommodation portion 321f For example, as shown in FIG. 5, four bolt holes H4 (not partially visible) may be formed at the accommodation portion 312a.

Figure 6:
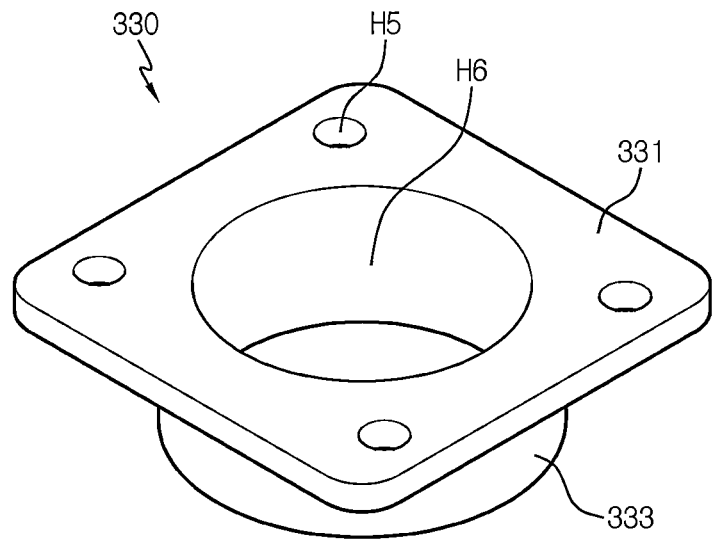
FIG. 6 is a perspective view schematically showing a connector gasket, employed at the battery pack according to an embodiment of the present disclosure.

FIG. 6 is a perspective view schematically showing a connector gasket, employed at the battery pack according to an embodiment of the present disclosure. Also, FIG. 7 is a partially sectioned view schematically showing the battery pack, taken along the line C-C' of FIG. 1.

Figure 7:
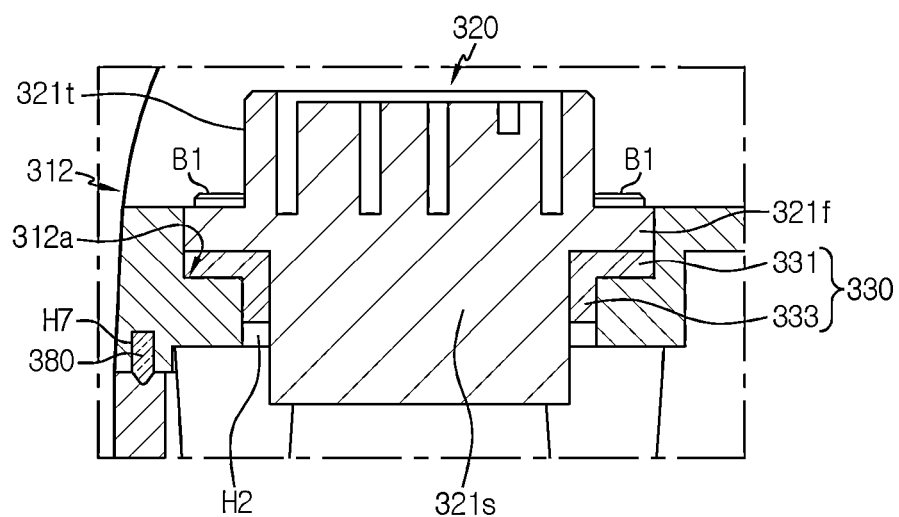
FIG. 7 is a partially sectioned view schematically showing the battery pack, taken along the line C-C' of FIG. 1.

Referring to FIGS. 6 and 7, a portion of the connector gasket 330 may be interposed between the insert hole H2 and the connector 320 so that foreign substances are not introduced between the insert hole H2 and the connector 320.

In addition, the connector gasket 330 may have a portion 333 that is bent at least once in one direction. For example, as shown in FIG. 6, the connector gasket 330 may have a portion 333 bent once in a lower direction at a center portion thereof. The bent portion 333 of the connector gasket 330 may be compressed and fixed to the insert hole H2 as the insert portion 321s of the connector 320 is inserted into the insert hole H2. The connector gasket 330 may have a synthetic rubber or silicone polymer.

Therefore, according to this configuration of the present disclosure, since the battery pack 300 of the present disclosure includes the connector gasket 330 having a portion 333 bent at least once in one direction and interposed between the insert hole H2 and the connector 320 and at least partially compressed and fixed by inserting the connector 320 into the insert hole H2 of the top cover 312, it is possible to prevent foreign substances (water) from penetrating into the gap between the connector 320 and the pack housing 310. In particular, since the portion 333 of the connector gasket 330 that is bent at least once may be compressed and fixed to the insert hole H2 of the top cover 312 by the connector 320, the waterproofing ability may be effectively improved.

More specifically, the connector gasket 330 may have a mounting portion 331 and a first bent portion 333. Here, the first bent portion 333 may be referred to as a portion 333 that is bent from the mounting portion 331 of the connector gasket 330 described above.

The mounting portion 331 may be configured to be compressed and fixed on the accommodation portion 312a of the top cover 312 by the fixing portion 321f That is, the mounting portion 331 may be interposed between the fixing portion 321f of the connector 320 and the accommodation portion 312a of the top cover 312. An opening H6 may be formed at the center of the mounting portion 331 so that a portion of the connector body 321 is inserted therein. The opening H6 may have a shape extending along an inner surface of the first bent portion 333 that extends in a lower direction. That is, the portion of the connector gasket 330 that is bent at least once may be the first bent portion 333. In addition, the first bent portion 333 may have a cylindrical shape extending in a lower direction from the mounting portion 331.

In addition, the connector gasket 330 may have a shape in which the mounting portion 331 corresponds to the accommodation portion 312a of the top cover 312. For example, the mounting portion 331 is approximately rectangular in a planar shape. In this case, the corners of the rectangle may have a rounded shape. The mounting portion 331 may have a plate shape extending in a horizontal direction from the tubular structure. Here, the horizontal direction means a direction parallel to the ground.

Further, a perforated hole H5 configured so that a bolt is inserted therein may be formed at the mounting portion 331. For example, as shown in FIG. 6, four perforated holes H5 may be formed adjacent to the corners of the mounting portion 331 of the connector gasket 330.

Figure 8:
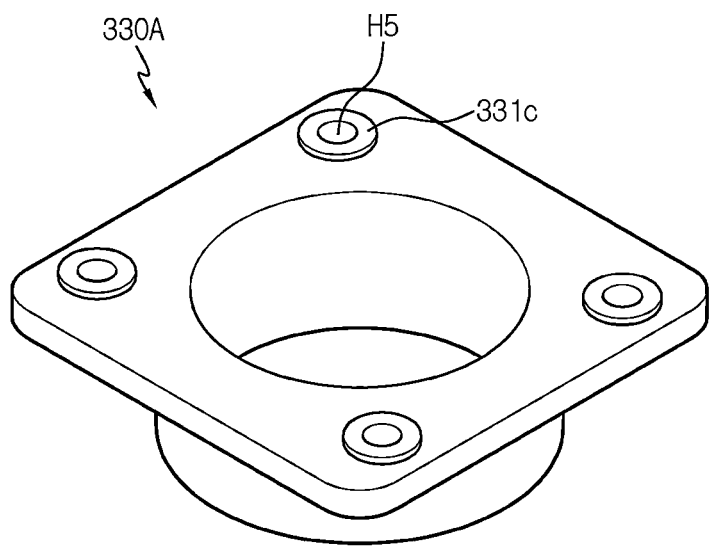
FIG. 8 is a perspective view schematically showing a connector gasket, employed at a battery pack according to another embodiment of the present disclosure.

FIG. 8 is a perspective view schematically showing a connector gasket, employed at a battery pack according to another embodiment of the present disclosure.

Referring to FIG. 8 along with FIGS. 4, 5 and 7, a connector gasket 330A of FIG. 8 may further include a cushion portion 331c, when compared to the connector gasket 330 of FIG. 6. The cushion portion 331c may be formed by raising a peripheral portion of the perforated hole H5 of the mounting portion 331 in an upper direction. If the connector 320 is fixed to the accommodation portion 312a of the top cover 312 using a bolt B1, the cushion portion 331c may be configured to buffer that the bolt B1 compresses the peripheral portion of the perforated hole H5.

For example, as shown in FIG. 8, the connector gasket 330A may have the cushion portion 331c protruding in an upper direction around the perforated hole H5. Although not shown in the drawing, the cushion portion 331c in which the peripheral portion of the perforated hole H5 is raised in a lower direction may also be formed on the lower surface of the mounting portion 331 of the connector gasket 330A.

Therefore, according to this configuration of the present disclosure, since the connector gasket 330A includes the cushion portion 331c formed at the peripheral portion of the perforated hole H5, it is possible to prevent the connector gasket 330A from being damaged due to compression of the bolt B1. In addition, the connector gasket 330A may be prevented from being severely deformed by compression of the bolt B1. Accordingly, even when the connector 320 is fixed to the accommodation portion 312a, it is possible to prevent the connector gasket 330A from being damaged or severely deformed to cause poor sealing.

Figure 9:
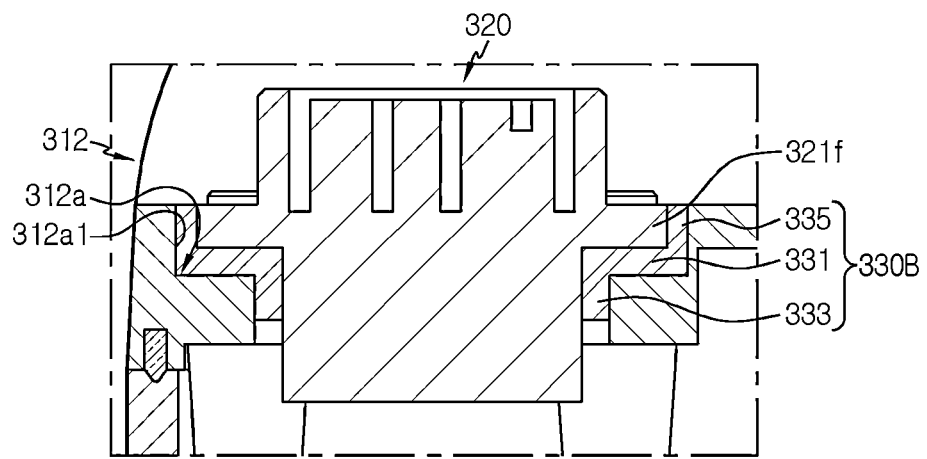
FIG. 9 is a partially sectioned view schematically showing a portion of the battery pack according to another embodiment of the present disclosure.

FIG. 9 is a partially sectioned view schematically showing a portion of the battery pack according to another embodiment of the present disclosure.

Referring to FIG. 9, a connector gasket 330B of FIG. 9 is identical to the connector gasket 330 of FIG. 7, except that a second bent portion 335 is further provided. That is, the connector gasket 330B may include a first bent portion 333, a mounting portion 331, and a second bent portion 335.

Here, the second bent portion 335 may be bent from an outer end of the mounting portion 331 to extend in an upper direction. In addition, the second bent portion 335 may have a cylindrical shape extending in an upper and lower direction. That is, the second bent portion 335 may have a shape extending along an outer end of the mounting portion 331.

In addition, the second bent portion 335 may be interposed between an inner sidewall 312a1 of the accommodation portion 312a and the fixing portion 321f of the connector 320. That is, the second bent portion 335 may be compressed and fixed to the inner sidewall 312a1 of the accommodation portion 312a by the fixing portion 321f.

Therefore, according to this configuration of the present disclosure, since the connector gasket 330B further includes the second bent portion 335 that is bent from the mounting portion 331 to extend in an upper direction and is interposed between the inner sidewall 312a1 of the accommodation portion 312a and the fixing portion 321f of the connector 320, the connector gasket 330B has more bending structures and compression portions compared to the connector gasket 330 of FIG. 6, thereby further improving the sealing property between the connector 320 and the accommodation portion 312a.

Figure 10:
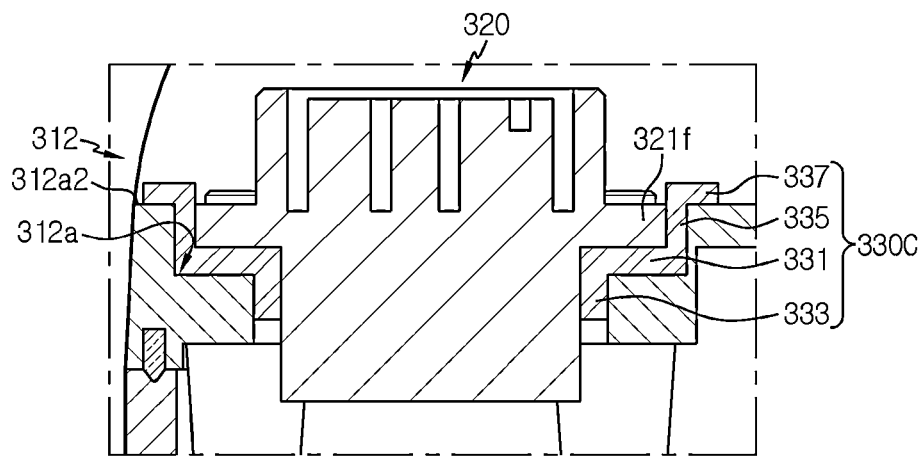
FIG. 10 is a partially sectioned view schematically showing a portion of a battery pack according to still another embodiment of the present disclosure.

FIG. 10 is a partially sectioned view schematically showing a portion of a battery pack according to still another embodiment of the present disclosure.

Referring to FIG. 10, a connector gasket 330C of FIG. 10 has the same configuration as the connector gasket 330B of FIG. 9, except that a third bent portion 337 is further provided. That is, the connector gasket 330C may include a first bent portion 333, a mounting portion 331, a second bent portion 335, and a third bent portion 337.

Specifically, the third bent portion 337 may be configured to be exposed out of the accommodation portion 312a. The third bent portion 337 may have a shape bent from an end (an upper end) of the second bent portion 335 in an extension direction to extend in a horizontal direction. That is, the third bent portion 337 may have a shape bent in an outer direction with respect to the body 321 of the connector 320. That is, the third bent portion 337 may be located at an upper surface 312a2 of the peripheral portion of the accommodation portion 312a. In another form, the third bent portion 337 may have a shape (not shown) bent and extended in both an outer direction and an inner direction. That is, the third bent portion 337 may be located to be bent and extended at the upper surface of the fixing portion 321f of the connector 320.

In addition, the third bent portion 337 may have a shape extending in a horizontal direction to surround an outer (horizontal) end of the fixing portion 321f of the connector 320.

Therefore, according to this configuration of the present disclosure, since the connector gasket 330C further includes the third bent portion 337 that is exposed out of the accommodation portion 312a and is bent from the end of the second bent portion 335 in an extension direction to extend in a horizontal direction, the connector gasket 330C has more bending structures compared to the connector gasket 330B of FIG. 9, thereby further improving the sealing property between the connector 320 and the accommodation portion 312a.

Figure 11:
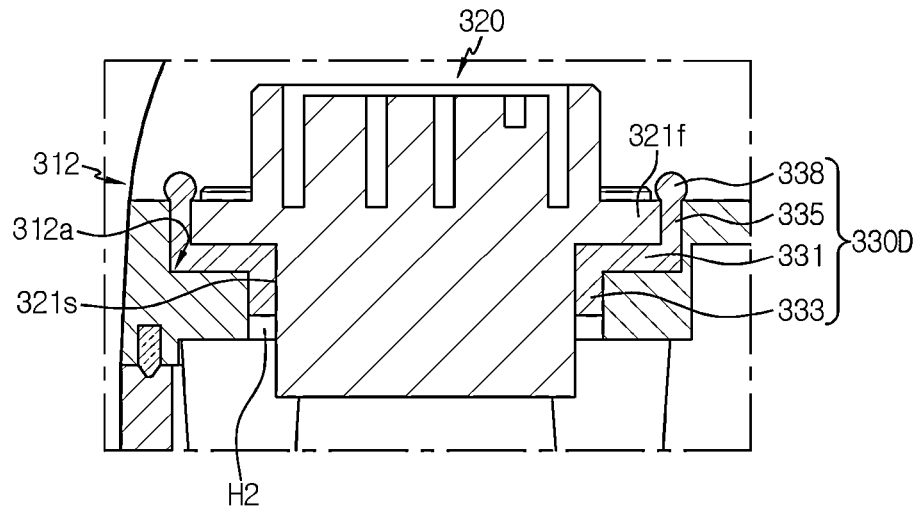
FIG. 11 is a partially sectioned view schematically showing a portion of a battery pack according to still another embodiment of the present disclosure.

FIG. 11 is a partially sectioned view schematically showing a portion of a battery pack according to still another embodiment of the present disclosure.

Referring to FIG. 11, a connector gasket 330D of FIG. 11 has the same configuration as the connector gasket 330B of FIG. 9, except that a protrusion 338 is further provided. That is, the connector gasket 330D may include a first bent portion 333, a mounting portion 331, a second bent portion 335, and a protrusion 338.

Specifically, the protrusion 338 may be located to be exposed out of the accommodation portion 312a. The protrusion 338 may be located higher than the indented portion of the accommodation portion 312a. That is, the protrusion 338 may be located to be exposed to the outside between the accommodation portion 312a and the fixing portion 321f of the connector 320. The protrusion 338 may be configured to cover a gap between the second bent portion 335 and the fixing portion 321f A lower portion of the protrusion 338 may be located on the gap to cover the gap between the second bent portion 335 and the fixing portion 321f. That is, a portion of the protrusion 338 protruding toward the fixing portion 321f may cover the gap between the second bent portion 335 and the fixing portion 321f.

In addition, the protrusion 338 may be formed to be thicker than a separation distance between the accommodation portion 312a and the fixing portion 321f Accordingly, the protrusion 338 may be prevented from being moved between the accommodation portion 312a and the fixing portion 321f by means of the upper surfaces of the accommodation portion 312a and the fixing portion 321f.

That is, since the connector gasket 330D has the protrusion 338, the first bent portion 333 of the connector gasket 330D may be prevented from excessively moving in a lower direction while the insert portion 321s of the connector 320 is being inserted into the insert hole H2 of the top cover 312.

Moreover, the protrusion 338 may have a shape extending along the top surface of the second bent portion 335. That is, the protrusion 338 may have a shape extending along an upper edge of the second bent portion 335 with a cylinder shape.

Therefore, according to this configuration of the present disclosure, since the connector gasket 330D further includes the protrusion 338 that is exposed out of the accommodation portion 312a and is formed at an end of the second bent portion 335 in an extension direction, the sealing property between the connector 320 and the accommodation portion 312a may be further improved compared to the connector gasket 330B of FIG. 9, and the first bent portion 333 may be prevented from being pushed down in a lower direction so as to be properly positioned in the insert hole H2. Accordingly, it is possible to improve the manufacturing efficiency and the waterproofing ability of the battery pack.

Figure 12:
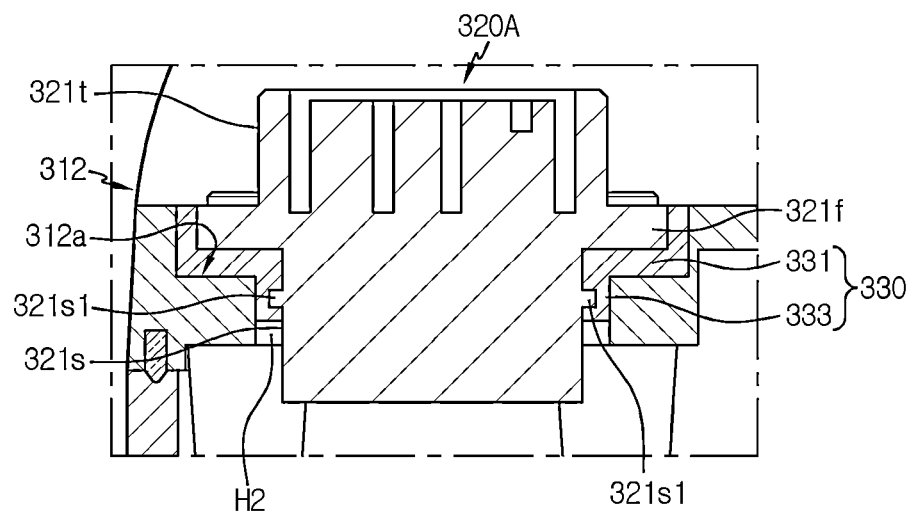
FIG. 12 is a partially sectioned view schematically showing a portion of a battery pack according to still another embodiment of the present disclosure.

FIG. 12 is a partially sectioned view schematically showing a portion of a battery pack according to still another embodiment of the present disclosure.

Referring to FIG. 12, a connector 320A of FIG. 12 has the same configuration as the connector 320 of FIG. 7, except that a pressing protrusion 321s1 is further formed in the insert portion 321s. That is, the connector 320A may include a coupling portion 321t, a fixing portion 321f, an insert portion 321s, and a pressing protrusion 321s1.

Specifically, when the connector 320A is inserted into the accommodation portion 312a of the top cover 312, the pressing protrusion 321s1 may have a shape protruding toward the first bent portion 333 in order to press the first bent portion 333 of the connector gasket 330 toward the edge of the insert hole H2. The pressing protrusion 321s1 may have a shape extending along the horizontal periphery of the insert portion 321s of the connector 320A. That is, the pressing protrusion 321s1 may have a strip shape extending in a horizontal direction along the outer surface of the insert portion 321s. In this case, the mounting portion 331 may be interposed between the fixing portion 321f of the connector 320A and the inner surface of the accommodation portion 312a.

Thus, according to this configuration of the present disclosure, since the pressing protrusion 321s1 configured to press the first bent portion 333 toward the edge of the insert hole H2 is formed in the insert portion 321s, a part of the first bent portion 333 may be pressed and fixed to the edge surface of the insert portion 321s by the pressing protrusion 321s1. Accordingly, the sealing property between the connector 320A and the accommodation portion 312a may be further improved.

Figure 13:
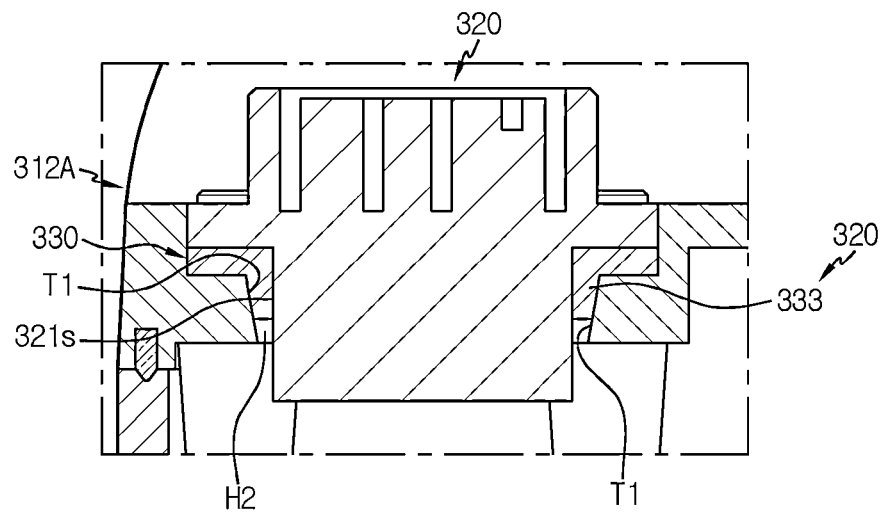
FIG. 13 is a partially sectioned view schematically showing a portion of a battery pack according to still another embodiment of the present disclosure.

FIG. 13 is a partially sectioned view schematically showing a portion of a battery pack according to still another embodiment of the present disclosure.

Referring to FIG. 13, a top cover 312A of FIG. 13 has the same configuration as the top cover 312 of FIG. 7, except that a tapered structure T1 is further formed at the edge of the insert hole H2. That is, the insert portion 321s of the connector 320 may have a vertical surface in an upper and lower direction. Specifically, the tapered structure T1 formed at the edge of the insert hole H2 may be configured to have a diameter gradually decreasing in a lower direction. That is, as the insert portion 321s of the connector 320 is inserted in a lower direction, the pressure applied to the first bent portion 333 of the connector gasket 330 may be increased further.

Accordingly, a part of the first bent portion 333 of the connector gasket 330 located lower than the edge surface of the insert hole H2 may be pressed by the insert portion 321s of the body 321 of the connector 320 more greatly.

Therefore, according to this configuration of the present disclosure, since the tapered structure T1 configured to have a diameter gradually decreasing in a lower direction is formed at the edge of the insert hole H2 of the top cover 312A, the sealing property between the connector 320 and the accommodation portion 312A may be further improved compared to the sealing structure between the connector and the insert hole of FIG. 9. Accordingly, the waterproof ability of the battery pack may be further improved.

Meanwhile, the battery pack 300 according to an embodiment of the present disclosure may further include various devices (not shown) for controlling the charging and discharging of the plurality of secondary batteries 100, for example, a BMS (Management System Module) module 280 (FIG. 2), a current sensor, a fuse, and the like.

Meanwhile, an electronic device (not shown) according to an embodiment of the present disclosure includes at least one battery pack 300 described above. The electronic device may further include a device housing (not shown) having an accommodation space for accommodating the battery pack 300.

In addition, the battery pack 300 according to an embodiment of the present disclosure may be included in a vehicle such as an electric vehicle or a hybrid electric vehicle. That is, at least one battery pack 300 according to an embodiment of the present disclosure as described above may be mounted in a vehicle body of the vehicle according to an embodiment of the present disclosure.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 300: battery pack | |
| 100: secondary battery | 210: module case |
| 111, 111a, 111b: electrode terminal, positive electrode terminal, negative electrode terminal | |
| 310: pack housing | H2: insert hole |
| T1: tapered structure | |
| 320: connector | |
| 321: body | 321s: insert portion |
| 321f: fixing portion | 323: connection terminal |
| 321s1: pressing protrusion | |
| 330: connector gasket | |
| 331: mounting portion | 333: first bent portion |
| 335: second bent portion | 337: third bent portion |
| 338: protrusion | |
| 312: top cover | |
| 314: middle housing | 316: bottom support |
| 312a: accommodation portion | |

What is claimed is:

1. A battery pack, comprising:
a plurality of secondary batteries;
a connector including a connection terminal configured to receive electricity from an external device or to supply power to an outside of the battery pack, and an electrically insulating body surrounding a portion of the connection terminal;
a pack housing having an inner space in which the plurality of secondary batteries are accommodated and having an insert hole so that at least a part of a body of the connector is inserted therein; and
a connector gasket interposed between the insert hole and the connector and having a portion that is bent at least once in one direction, the connector gasket being at least partially compressed and fixed by inserting the connector into the insert hole,
wherein the pack housing has an accommodation portion formed by indenting a peripheral portion of the insert hole in an inner direction,
wherein the connector includes:
an insert portion configured to protrude in a lower direction to be inserted into the insert hole; and
a fixing portion configured to protrusively extend in a horizontal direction from an upper portion of the insert portion to be fixed to the accommodation portion, and
wherein the connector gasket includes:
a mounting portion configured to be compressed and fixed to the accommodation portion by the fixing portion; and
a first bent portion bent from the mounting portion to extend in a lower direction to be inserted into the insert hole, the first bent portion being compressed and fixed by the insert portion.

2. The battery pack according to claim 1, wherein the connector gasket further includes a second bent portion bent from the mounting portion to extend in an upper direction and interposed between an inner sidewall of the accommodation portion and the fixing portion of the connector.

3. The battery pack according to claim 2, wherein the connector gasket further includes a third bent portion exposed out of the accommodation portion and bent from an end of the second bent portion in an extending direction to extend in a horizontal direction.

4. The battery pack according to claim 2, wherein the connector gasket further includes a protrusion exposed out of the accommodation portion and bent from an end of the second bent portion in an extending direction to cover a gap between the second bent portion and the fixing portion.

5. The battery pack according to claim 1, wherein a pressing protrusion configured to press the first bent portion toward an edge of the insert hole is defined in the insert portion.

6. The battery pack according to claim 1, wherein the insert hole has a tapered structure to have a diameter decreasing in a lower direction.

7. The battery pack according to claim 1, wherein the mounting portion further includes:
- a perforated hole into which a bolt is inserted; and
- a cushion portion formed by raising a peripheral portion of the perforated hole to buffer that the bolt compresses the peripheral portion of the perforated hole.

8. An electronic device, comprising at least one battery pack according to claim 1.

9. A vehicle, comprising at least one battery pack according to claim 1.

* * * * *